United States Patent [19]

Bullat

[11] 4,417,185

[45] Nov. 22, 1983

[54] DRIVING SYSTEM FOR ROLL-UP SHADES, BLINDS, ROLLING SHUTTERS AND THE LIKE

[75] Inventor: Jean Bullat, Bonneville, France

[73] Assignee: Somfy, France

[21] Appl. No.: 248,223

[22] Filed: Mar. 27, 1981

[30] Foreign Application Priority Data

Apr. 18, 1980 [FR] France ............................... 80 09168

[51] Int. Cl.$^3$ .............................................. H02K 7/00

[52] U.S. Cl. ........................................ 318/2; 318/266; 318/466; 192/138; 160/166 R

[58] Field of Search .................... 318/2, 467, 468, 466, 318/266, 267; 74/625, 626; 192/138, 139, 142 R; 160/166 R, 107, DIG. 17

[56] References Cited

U.S. PATENT DOCUMENTS

| | | | |
|---|---|---|---|
| 2,231,778 | 2/1941 | Swanson | 160/DIG. 17 |
| 3,355,149 | 11/1967 | Wiegelmann et al. | 160/170 |
| 3,559,024 | 1/1971 | Mardev | 160/DIG. 17 |
| 3,603,372 | 9/1971 | Dietzsch | 160/170 X |

*Primary Examiner*—Ulysses Weldon

*Attorney, Agent, or Firm*—Robert E. Burns; Emmanuel J. Lobato; Bruce L. Adams

[57] ABSTRACT

This driving system for roll-up shades, blinds, rolling shutters or the like is applicable to tubular winding tubes of the shade or the like and comprises an electric motor having its shaft coupled to the tube, and an emergency manual control mechanism in the form of a worm and wheel gearing adapted, in case of failure in the supply of electric current, to drive at the same speed the tubular casing of the electric motor and the winding tube, without causing any misadjustment of the automatic stop device; for this purpose, a particularly compact kinematic connection is provided and comprises a first toothed ring rigid with the winding tube and connected through adequate kinematic means including a pinion rotatably mounted inside a drive wheel to a second toothed ring disposed on the opposite face of this wheel and connected via a toothed wheel to cam members incorporated in the automatic stop means.

8 Claims, 6 Drawing Figures

DRIVING SYSTEM FOR ROLL-UP SHADES, BLINDS, ROLLING SHUTTERS AND THE LIKE

FIELD OF THE INVENTION

The present invention relates in general to devices for rotatably driving roll-up shades, blinds, rolling shutters, or the like herein referred to as shades. As a rule, devices of this character comprise an electric motor enclosed in a tubular casing adapted to be fitted inside the winding tube of the roller-blind or the like, the shaft of said motor being coupled to the winding tube through suitable kinematic means. A first device is provided for holding the tubular casing against rotation, notably during the motor operation, and a second device is provided for holding the winding tube against rotation with respect to said tubular casing when the motor is inoperative, to prevent the untimely unwinding of the shutter, blind or shade by mere gravity. Automatic stop means are usually provided within the driving system for switching off the motor when the motor shaft has performed a predetermined number of revolutions, i.e. when the blind, shade, shutter or the like is fully rolled up or fully unrolled.

Furthermore, as a rule, driving systems of the type contemplated herein comprise an emergency mechanism adapted to be actuated manually for rotatably driving at will the tubular casing of the electric motor; this emergency mechanism comprises a drive wheel rotatably rigid with, and concentric to, the tubular casing.

This mechanism may comprise for example a reduction gearing of the bevel pinion and bevel wheel type, or of the worm and wheel type, in which the bevel pinion or the worm is adapted to be drivingly coupled to a crank-handle. The second system is more advantageous because it may be irreversible and constitutes in fact the first device contemplated in the art for holding the tubular casing against rotation. A rotary collector is provided to permit the energization of the motor irrespective of the momentary angular position of the tubular casing thereof. The fixed component element or elements of the automatic stop device and of the rotary collector are rigid with a stationary support carrying the complete driving system. This mechanism is also capable of providing a constant kinematic rotary coupling between the roll-up tube and the movable part or parts of the automatic stop device without passing through the motor shaft, whereby any actuation of the manually operable emergency mechanism cannot detrimentally interfere with the stopping points of the roller blind, shutter or the like, whether in its fully wound or fully unwound position.

THE PRIOR ART

In a known driving system of this character, as illustrated diagrammatically in FIG. 1 of the accompanying drawings, only the motor 1 proper and the irreversible reduction gearing 2 associated therewith are enclosed in the tubular casing 1' of said motor 1. All the other component elements are enclosed in another casing 20 of considerably larger diameter, disposed at one end of the motor 1 and constituting the fixed structure supporting the complete driving system. In fact, the drive wheel 14 consisting in this example of a worm wheel meshing with a worm 13 is rigidly connected to the motor tubular casing 1' through a cylindrical tubular shaft 15 of relatively small diameter and relatively great length, which is therefore relatively remote from said casing 1'. An extension of this tubular shaft 15, still more remote from the casing 1' than drive wheel 14, supports the movable disc 16 of the rotary collector and is rigid therewith, the cavity of the tubular shaft 15 constituting a passage for the movable section 22 of the motor current supply cable connecting this movable disc 16 to the casing 1'. The fixed portion 19 of the rotary collector is housed in the outermost portion 20' of casing 20, and the fixed section 21 of the current supply cable is connected directly thereto.

The section of tubular shaft 15 which extends from tubular casing 1' to drive wheel 14 and supports the outermost portion of the winding tube 3 also supports the automatic stop device. This automatic stop device comprises a flange 4 rigidly connected through a collar portion to the winding tube 3 which supports a dual planet pinion 6 meshing on the one hand with a toothed wheel 5 rigidly coupled to the casing 20 via a sleeve 23, and on the other hand with another toothed wheel 7 supporting a cam 8 and revolving about the sleeve 23 and tubular shaft 15. This cam 8 is adapted to actuate a microswitch 9 supported by an arm rotatably solid with the casing 20 with the interposition of an adjustment knob 11, so that the angular position of microswitch 9 can be adjusted as necessary. Consequently, the portion of casing 20 enclosing the component elements of the automatic stop device has relatively large over-all dimensions, and a relatively substantial space must be provided between the end of winding tube 3 and the end 20' of casing 20 which is to be fastened to the wall or the window or door frame, and this constitutes a major inconvenience.

SUMMARY OF THE INVENTION

The driving system for roll-up shades, blinds, rolling shutters and the like according to the present invention is characterized in that the motor tubular casing is fastened to the drive wheel of the manually actuatable emergency mechanism, substantially through one end of said casing, the rotary collector being mounted inside the tubular casing. The automatic stop device is disposed in the tubular casing and/or in a recess constituting an extension of the inner space of said casing, said recess being formed axially through the drive wheel. Another function of this recess is to permit the passage of the fixed portion of the supply cable which is to be connected to the fixed portions of the rotary collector. The mechanism providing the necessary kinematic coupling between the winding tube and the movable component elements of the automatic stop device comprises elements disposed on either side of the drive wheel, in close vicinity thereof, and which are interconnected by kinematic means through the flange of said drive wheel.

According to an exemplary form of embodiment of the present invention, the mechanism constituting the kinematic coupling between the blind winding tube and the movable members of the automatic stop device comprises a first toothed ring disposed concentrically and externally with respect to the tubular casing and adapted to be rigidly connected to the winding tube; the teeth of this first toothed ring are in constant meshing engagement with a toothed pinion journaled in or on the registering drive wheel, and disposed eccentrically in relation thereto. This toothed pinion is housed for instance in a cylindrical case of corresponding dimensions formed through the flange of the drive wheel;

alternatively, it could also be supported by a pivot pin or stub shaft carried by said flange and extending at right angles thereto. This toothed pinion is in constant meshing engagement with the teeth of another toothed ring mounted for rotation concentrically to the first toothed ring and opposite the latter with respect to the drive wheel. The first toothed ring has the same number of teeth as the second toothed ring and the latter is in constant meshing engagement with a toothed wheel opening into the axial cavity of the drive wheel. This drive wheel is coupled rotatably and kinematically to the movable component elements of the automatic stop device.

According to another feature characterizing this invention, which is closely connected to the first one broadly disclosed hereinabove, the second toothed ring comprises two concentric sets of teeth, i.e. an internal set and an external set of teeth. The external teeth are in meshing engagement with the pinion journaled on the first ring, and the external teeth are in meshing engagement with the toothed wheel opening into the axial cavity formed in the drive wheel. The first ring has the same number of teeth as the external set of teeth of the second ring. The other component elements are identical with those of the first form of embodiment broadly described hereinabove.

In these two forms of embodiment, the kinematic coupling between the winding tube and the movable component elements of the automatic stop device take places in the same way, whether the winding tube is driven electrically or manually. In fact, to each revolution of the winding tube and the first ring, there constantly corresponds one revolution of the second ring, the angular speeds of the two rings remaining constantly identical.

It is therefore the primary object of the present invention to provide a more compact and less cumbersome driving system than the system taught by the prior art, whereby the winding tube of the shade, blind, shutter or the like can occupy the maximum possible portion of the longitudinal space available for fitting this winding tube of the shade, blind or shutter or the like, without requiring additional clearance space taken from the window or door frame or the surrounding masonry or brickwork for fitting the portion of the winding system which is not enclosed in the tubular casing of the driving motor and in the winding tube.

Three typical forms of embodiment of the driving system of this invention will now be described in detail with reference to FIGS. 2 to 6 of the accompanying drawings.

THE DRAWINGS

FIG. 3 is a section taken along the line III—III of FIG. 4, showing on a larger scale one portion of this first form of embodiment;

FIG. 4 is a section taken along the line IV—IV of FIG. 3 showing the same portion of the first form of embodiment;

FIG. 5 is a diagrammatic longitudinal section illustrating a second form of embodiment of the invention, and FIG. 6 is a view similar to FIG. 5 showing a third form of embodiment of the invention.

DESCRIPTION OF THE PREFERRED EMBODIMENT

Figure 2:
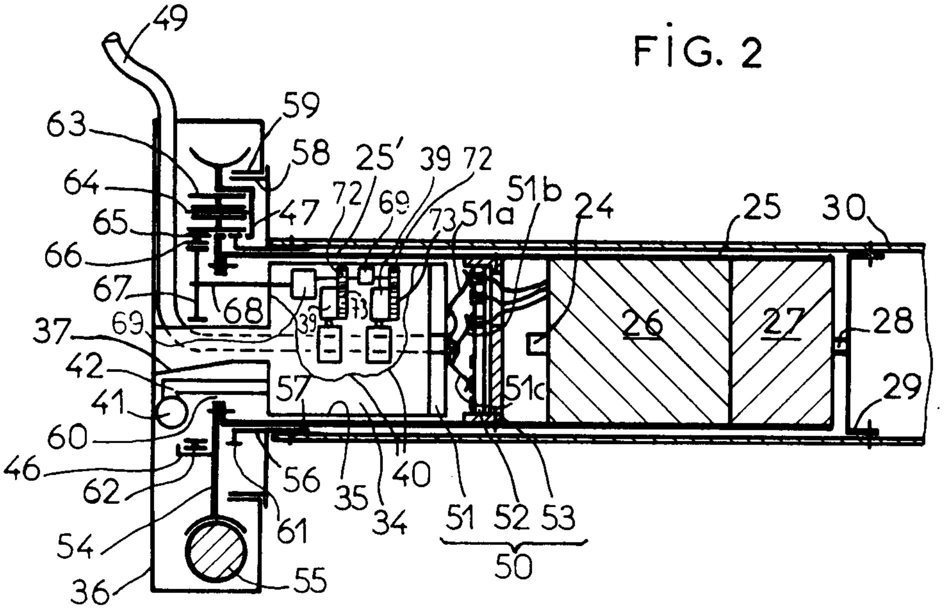
FIG. 2 is a diagrammatic longitudinal section illustrating a first form of embodiment.

As illustrated in FIGS. 2 to 4 of the drawings, the first form of embodiment of the driving system of the present invention comprises, enclosed in a preferably cylindrical tubular casing 25, an electric motor 26 having its shaft 24 coupled through suitable kinetic means to a reduction gearing 27, for example of the irreversible type, of which the output shaft 28 carries a driving flange 29 adapted to be rotatably connected to the winding tube 30 of a roll-up shade or the like, this tube 30 surrounding concentrically the tubular casing 25 when the roll-up shade or the like is fitted in service position in an aperture. The tubular casing 25 comprises an extension 25' on the side opposite the driving flange 29. The irreversible reduction gearing 27 could be replaced, if desired, by a reversible reduction gearing, but in this case an electromagnetic brake should be disposed within the tubular casing 30 between the motor 26 and the rotary collector 50. This brake should be so constructed as to be capable of operating automatically when the motor 26 is not energized, in order to prevent any untimely unwinding of the blade or blind by mere gravity.

The extension 25' of the tubular casing 25 encloses an automatic stop device 34 adapted to cut off the motor current supply when the motor shaft 24 has accomplished a predetermined number of revolutions, i.e. when the shade or blind is either fully wound or fully unwound or paid off. The automatic stop device 34 comprises a fixed portion consisting, for example, of a cylindrical inner case 35 rigidly secured to a fixed external casing 36 supporting the complete driving system by means of a rigid, substantially central extension or arm 37 fastened to the external casing 36 by means of a screw 38 (see FIG. 3). The automatic stop device 34 comprises movable parts consisting notably of cam members 39 adapted to cooperate through their external contours with microswitches 40 secured to the fixed cylindrical inner casing 35. These cam members 39 are so adjustable that the single notch formed in each cam be aligned with one another with the members controlling the actuation of the microswitches when the shade or blind is either wound up completely or paid out completely. Push members such as 41, parallel to the worm 55 and connected by means of rods 42 to the movable component elements of the automatic stop device, are provided for adjusting the angular positions of said cam members in their operative positions. A typical example of this automatic stop device is disclosed in the U.S. pending patent application Ser. No. 145,326 filed on Apr. 30, 1980.

A rotary collector 50 is mounted inside the extension 25', between the motor 26 and the automatic stop device 34. The fixed casing 35 of this device 34 constitutes the stationary structure supporting the fixed portion 51 of said rotary collector. This fixed portion 51 supports in turn three collector brushes **51*a*,51*b*,51*c* having each a fixed end connected to the supply cable 49 and the other end movable and adapted to cooperate with three concentric annular tracks supported by the movable portion 52 of said collector, which is secured to a support 53 rigid with the inner portion of tubular casing 25**.

The outermost portion of tubular casing 25 opposite said driving flange 29 is secured by means of screws 48 to the annular flange of a worm wheel 54 which is the member driving said casing, and is concentric thereto.

This worm wheel 54 is in constant meshing engagement with a worm 55 journaled in the fixed external casing 36 and provided at one end projecting from this casing with manual control means such as a crank handle (not shown). The outermost portion of the tubular casing 25 adjacent the worm wheel 54 is journaled inside an intermediate tubular member 56 having an integral extension 57 acting as a means for supporting the adjacent end of the winding tube 30. This intermediate tubular member 56 comprises a journal or bearing surface 58 of greater diameter rotating in turn in an internal cylindrical portion 59 solid with the fixed external casing 36. This external casing 36 consists of two half-sections or shells (see FIGS. 3 and 4) surrounding the worm wheel 54 and worm 55. A clearance 60 is provided in the flange of worm wheel 54 and is coaxial thereto, inside the tubular casing 25. The rigid extension 37 as well as the fixed portion of current supply cable 49 connected to the fixed portion 51 of the rotary current collector 50 extend through this clearance 60.

A mechanism is also provided which constitutes a constant kinematic rotary coupling between the winding tube 30 and the movable members, notably cam members 39, of the automatic stop device 34. This mechanism comprises a first toothed ring 61 disposed concentrically around the tubular casing 25 and adapted to be rigidly fastened to the winding tube 30. In this example, this first toothed ring 61 is provided with external teeth and is rigid with the intermediate tubular member 56. These external teeth are in constant meshing engagement with one end of a toothed pinion 63 rotating about a stub shaft 64 supported by the flange of the registering worm wheel 54 but eccentric in relation thereto. The major portion of this toothed pinion 63 is housed in a cavity 47 of corresponding dimensions, formed in the flange of wheel 54. Its stub shaft 64 extends at right angles from this flange. The toothed pinion 63 is also in constant meshing engagement, through a clearance formed in the flange of wheel 54, with the external teeth 65 of a second toothed ring 62 journally concentrically to the first toothed ring 61 in a circular cavity 46 (FIGS. 3 and 4) formed in the thickness of said flange of worm wheel 54 on the same side as said first toothed ring 61. The external set of teeth 65 of the second toothed ring 62 and the likewise external set of teeth of the first toothed ring 61 are identical and have the same number of teeth. The toothed pinion 63 will thus provide the necessary kinematic coupling through the flange of worm wheel 54 between the two toothed rings 61 and 62 disposed on either side of said worm wheel 54. The second toothed ring 62 also comprises a set of internal teeth meshing with a toothed wheel 67 having one portion accessible from the axial clearance 60. This toothed wheel 67 is kinematically connected, notably through its arbor 68, and speed reducers 69 to pinions 72 driving gears 73 fixed to the cam members 39 of the automatic stop device 34.

When the driving system is to be operated electrically, the electric motor 26 is supplied with energizing current via cable 49, microswitches 40, brushes **51*a*,51*b*,51*c*, and the annular tracks of the movable portion 52 of rotary collector 50. Under these conditions, the tubular casing 25 is held against rotation by the irreversible worm wheel and worm gearing 54,55 so that this gearing remains stationary. Of course, the rotation of motor shaft 28 causes the winding tube 30 to rotate, for example in the direction to wind up the shade or blind. This rotational movement of winding tube 30 is attended by the rotation of the intermediate tubular member 56 and also of the first toothed ring 61. As the stub shaft 64 of pinion 63 is held in a fixed position by worm wheel 54 held likewise in a fixed position, pinion 63 is caused to rotate about its shaft 64, thus causing the second toothed ring 62 to rotate through the meshing engagement between pinion 63 and the outer set of teeth 65 of ring 62. Thus, since the sets of teeth 61 and 65 are identical, each revolution of winding tube 30 corresponds to one revolution of the second toothed ring 62, of which the inner set of teeth 66 rotatably drives the toothed wheel 67 and its shaft 68, and finally the cam members 39 rigid therewith. When the notches of said cam members 39 are aligned with one another the microswitches 40 are actuated so that the supply of energizing current to motor 26 is cut off and the rotational movement of winding tube 30** ceases, and the roll-up shade or blind winding or unwinding movement is completed.

In case of supply current failure, for example, it is possible to actuate the winding tube 30 manually. To do this, it is only necessary to actuate manually for rotation in the desired direction the worm 55 which drives the worm wheel 54 with the proper gear reduction, this wheel 54 driving in turn the tubular casing 25 of motor 26. Since this reduction gearing 27 is irreversible, its output shaft 28 is driven for rotation at the same angular velocity as the casing 25, and the same applies to the winding tube 30 and the first toothed ring 61. Now since this first toothed ring 61 revolves at the same speed as worm wheel 54, the toothed pinion 63 remains stationary as far as the axis of its stub shaft 64 is concerned, and its tooth or teeth meshing with the teeth 65 of the second toothed ring 62 will drive likewise the latter at the same speed. Thus, each revolution of the winding tube 30 causes one revolution of the second toothed ring 62, as when the winding tube 30 was driven from the electric motor. Therefore, the toothed wheel 67 and cam members 39 will be driven at exactly the same speed, whether the winding tube 30 is driven electrically or manually, and no misadjustment can occur in the two stopping points of the winding or unwinding movements of the roll-up blade or shade. It should also be noted that during the rotation of tubular casing 25 the rotary collector 50 constantly maintains the supply of current to the motor. Thus, whatever the angular position of casing 25, when the supply of energizing current to motor 26 is restored, it is possible to actuate the winding tube 30 electrically, and to discontinue its manual actuation.

In the second form of embodiment contemplated herein and illustrated diagrammatically in FIG. 5, the first toothed ring 61 is replaced by a first toothed ring **61*a* having internal teeth in lieu of external teeth as in the case illustrated in FIG. 2. This set of internal teeth meshes with one end of toothed pinion 63 which in this second form of embodiment is not journaled for rotation on a stub shaft 64 but fitted in a corresponding cavity 47*a* formed in the flange of worm wheel 54 with just the radial clearance necessary for permitting the pinion rotation therein. The second toothed ring 62 is replaced by a different second toothed wheel 62*a* comprising only an inner set of teeth 66*a* meshing on the one hand with the second end of pinion 63 and on the other hand with the teeth of wheel 67**. All the other component elements are identical with those of the first form of embodiment described hereinabove with reference to FIGS. 2 to 4 of the drawings. The thus modified assembly operates exactly like the first form of embodiment.

Figure 1:
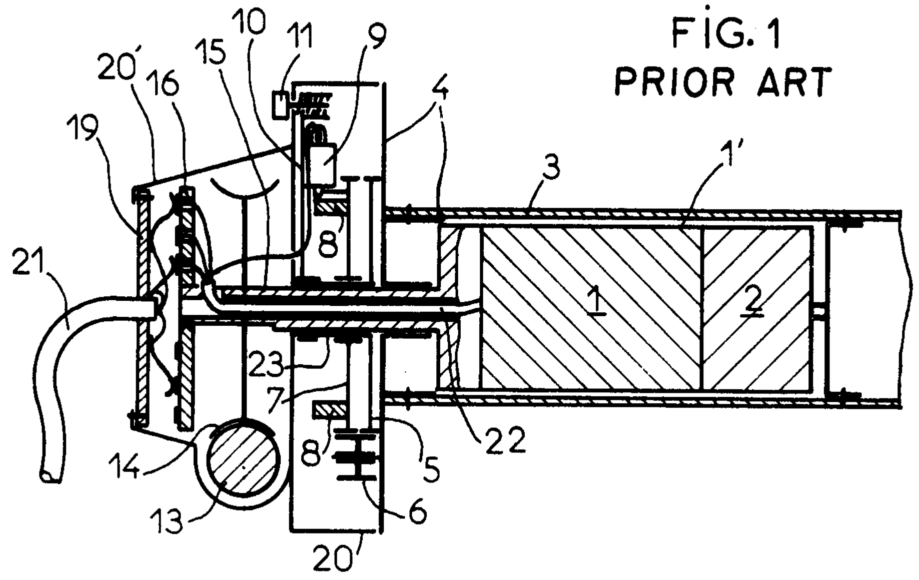
FIG. 1 PRIOR ART

In a third exemplary form of embodiment illustrated diagrammatically in FIG. 6, the toothed pinion 63 is housed in a cavity 47*a* (not shown in this Figure) similar to the cavity of FIG. 5, but the toothed rings 61 and 62 of the first form of embodiment are maintained without any modification. On the other hand, the clearance 60 formed through the flange of worm wheel 54 is defined by the inner wall of a tubular member 70 having one end 71 rigidly connected to the fixed support 36, so as to replace the support 37 of the structure of FIG. 1. This tubular member 70 extends inside the portion 25′ of tubular casing 25 enclosing the rotary collector 50 and the automatic stop device 34. Its function consists in supporting the stationary component elements of this automatic stop device, namely the fixed member 51 and the microswitches 40 (not shown in FIG. 6). Moreover, the external contour of this tubular member 70 acts as a journal to the concentric tubular casing 25 of which the outer surface acts likewise as a journal to the intermediate member 56. Thus, the latter is no more rotatably supported in a journal-forming cylindrical inner portion 59 of casing 36. A complementary advantageous feature characterizing the use of this tubular member 70 is that it constitutes a positive limit of the space in which, inter alia, the component elements of the automatic stop device 34 and the current supply cable 49 are housed, thus efficiently protecting these elements against undesired detrimental shocks and frictional contacts when the tubular casing 25 is driven manually for rotation about these elements. All the other component elements of the system are similar to, or identical with, those of the first form of embodiment described hereinabove with reference to FIGS. 2 to 4 of the drawings. This modified form of embodiment operates substantially like the first one.

In all the forms of embodiment of the invention described hereinabove the motor casing 25 is coupled directly to the worm wheel 54. However, it would not constitute a departure from the basic principle of the present invention to connect this motor casing 25 through a complementary tubular member to the worm wheel 54, this complementary member having advantageously an outer diameter slightly smaller than the inner diameter of tubular casing 25 so as to fit in the latter. This complementary tubular member, of relatively reduced length, would be disposed somewhat in the area of the intermediate member 56 supporting the winding tube 30 from inside. An advantageous feature resulting from this original arrangement would be a substantial reduction in the radial gap left between the tubular casing 25 and the winding tube 30, so that it would thus be possible to increase the outer diameter of casing 25 accordingly and therefore the space available inside this casing, without changing the size of the outer diameter of the winding tube.

All the forms of embodiment described hereinabove are characterized by a particularly compact structure, so that they are considerably less cumbersome than similar prior art systems. In fact, the pair of toothed rings disposed on either side of worm wheel 54 are housed within the thickness of this wheel 54 and the over-all dimension, measured along the longitudinal axis of motor 26, of the portion of the driving system which is not enclosed in the winding tube 30, is extremely short; more particularly, it is clear that this axial dimension does not exceed the axial width of the worm wheel 54 and of its stationary support-casing 36.

What is claimed is:

1. A driving system for roll-up shades comprising a rotatable winding tube on which the shade is wound, a tubular casing concentrically disposed in an end portion of the winding tube, an electric motor mounted in said tubular casing and having a shaft, first coupling means kinematically coupling said motor shaft with said winding tube to drive said winding tube in rotation relative to said tubular casing when said motor is energized and to fix said winding tube relative to said tubular casing when said motor is deenergized, manually operable means for rotating said tubular casing to rotate said winding tube when said motor is deenergized, said manually operable means comprising a drive wheel having a flange portion fixed to said tubular casing at an outer end thereof, a stationary housing for said drive wheel, rotary collector means for supplying energizing current to said motor, said rotary collector means being disposed in said tubular casing and comprising a rotatable portion fixed to said tubular casing and a stationary portion connected with said stationary housing, circuit means connecting said rotary collector means with said motor, said circuit means including automatic stop means for cutting off the supply of energizing current to said motor when said shade is fully wound on said winding tube or is fully unwound, said automatic stop means being disposed in said tubular casing and comprising a stationary member connected with said stationary housing and a movable member, and second coupling means coupling said movable member of said automatic stop means kinematically with said winding tube, said second coupling means comprising component elements disposed on opposite sides of said flange portion of said drive wheel in close vicinity thereof and means kinematically connecting said component elements with one another.

2. A driving system according to claim 1, wherein said component elements of said second coupling means between said winding tube and said movable member of said automatic stop means comprise a first toothed ring disposed on one side of said drive wheel concentrically about said tubular casing and fixed to said winding tube, and a second toothed ring journaled concentrically with said drive wheel on the opposite side thereof from said first toothed ring, and in which said kinematic connecting means comprises a pinion rotatably supported by said drive wheel eccentrically thereof and meshing with said first toothed ring and said second toothed ring, said second coupling means further comprising a toothed wheel rotatably supported eccentrically of said second toothed ring and having a shaft extending through an axial aperture in said drive wheel and means kinematically coupling said toothed wheel with said movable member of said automatic stop means.

3. A driving system according to claim 8, wherein said second toothed ring has the same number of teeth as said first toothed ring.

4. A driving system according to claim 8, wherein said first toothed ring has internal teeth meshing with said pinion.

5. A driving system according to claim 8, wherein said first toothed ring has external teeth meshing with said pinion.

6. A driving system according to claim 2, wherein said second toothed ring has external teeth meshing with said pinion and internal teeth meshing with said toothed wheel.

7. A driving system according to claim 2, wherein said second toothed ring has internal teeth meshing both with said pinion and with said toothed wheel.

8. A driving system according to claim 1, wherein said automatic stop means and said rotary collector are disposed in a stationary tubular member which is inside said tubular member which is inside said tubular casing and is supported by said stationary housing, said tubular member providing a fixed support for said stationary portion of said rotary collector and for said stationary member of said automatic stop means.

* * * * *